(12) United States Patent
Flax

(10) Patent No.: US 6,846,346 B1
(45) Date of Patent: Jan. 25, 2005

(54) SULFATIZATION PROCESS FOR METAL EXTRACTION FROM SULFIDE ORES

(75) Inventor: Solomon Flax, Jerusalem (IL)

(73) Assignee: Joma Chemicals AS, Limingen (NO)

(*) Notice: Subject to any disclaimer, the term of this patent is extended or adjusted under 35 U.S.C. 154(b) by 572 days.

(21) Appl. No.: 09/830,830
(22) PCT Filed: Aug. 29, 2000
(86) PCT No.: PCT/IL00/00513
§ 371 (c)(1), (2), (4) Date: Feb. 28, 2002
(87) PCT Pub. No.: WO01/16384
PCT Pub. Date: Mar. 8, 2001
(Under 37 CFR 1.47)

(30) Foreign Application Priority Data

Aug. 30, 1999 (IL) .................................................. 131652

(51) Int. Cl.[7] .............................................. C21B 9/00
(52) U.S. Cl. ........................... 75/710; 75/711; 75/743; 423/41; 423/52; 423/106; 423/146; 423/517; 423/544; 423/557; 423/558
(58) Field of Search ......................... 75/710, 711, 743; 423/41, 52, 106, 146, 517, 544, 557, 558

(56) References Cited

U.S. PATENT DOCUMENTS

| 3,860,696 A | * | 1/1975 | McGauley et al. | ......... 423/558 |
| 4,003,740 A | * | 1/1977 | Huggins et al. | ............... 75/424 |
| 4,119,698 A | * | 10/1978 | Zimmer et al. | ............... 423/82 |
| 5,484,579 A | * | 1/1996 | O'Brien | ....................... 423/36 |

FOREIGN PATENT DOCUMENTS

AU 35116 * 5/1973

* cited by examiner

*Primary Examiner*—Melvyn Andrews
(74) *Attorney, Agent, or Firm*—Townsend & Townsend & Crew LLP; Nathan S. Cassell

(57) ABSTRACT

The invention provides a hydrometallurgical process for treating metal-containing sulfide ores and concentrates, comprising reacting said metal-containing sulfide with concentrated sulfuric acid at a temperature of between about 300° C. and 400° C. in the presence of oxygen to produce a solid metal sulfate product and a gaseous product which is primarily $SO_3$, wherein said metal is selected from the group consisting of iron, copper, zinc, nickel, cobalt and manganese. Said metal sulfate product is then leached with dilute sulfuric acid to form a metal-containing solution, from which the metal values are separated by precipitation at raised $H_2SO_4$ concentrations obtained by saturating the solution with the gaseous $SO_3$ from the sulfatization reaction step.

11 Claims, 1 Drawing Sheet

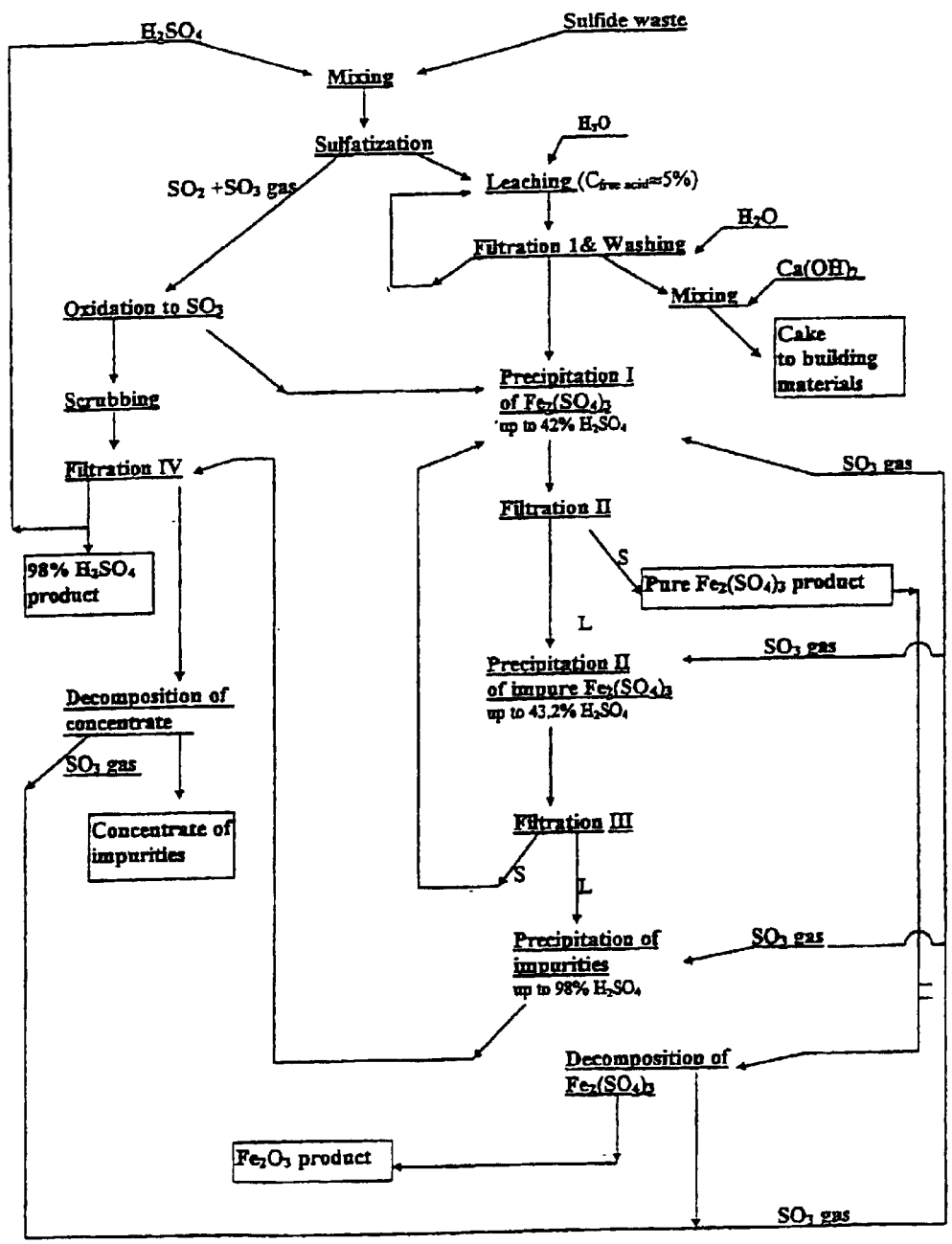

SULFATIZATION PROCESS FOR METAL EXTRACTION FROM SULFIDE ORES

TECHNICAL FIELD

The present invention relates to the field of hydrometallurgical processing of sulfide metal-containing ores and sulfide waste (dump sulfide tails) obtained after separation of sulfide concentrates of zinc, copper etc. by flotation aimed at production of metal sulfates, oxides, and other compounds as well as sulfuric acid, wherein said metal is selected from the group consisting of iron, copper, zinc, nickel, cobalt and manganese.

BACKGROUND ART

The method for calcination of iron sulfides, pyrite, marcasite etc. at a high temperature 900° C. according to the reaction:

$$4FeS_2 + 11O_2 \rightarrow 2Fe_2O_3 + 8SO_2 \quad (1)$$

is known. The escaping gas is converted to sulfuric acid, and a calcine ($Fe_2O_3$) is used for production of various iron compounds or applied in ferrous metallurgy to obtain metal iron. However, because of a high residual content of sulfur in the calcine, its application in metallurgy is limited and it is usually dumped. [Short Chemical Encyclopedia, Moscow, 1979].

There is known a method of sulfatization of sulfide materials by their treatment with concentrated sulfuric acid at 200° C.–300° C. [U.S. Pat. No. 1,895,811, 1933, L. EMakovezky, H. Morgan]. This process is described by a reaction:

$$MeS + 4H_2SO_4 \rightarrow MeSO_4 + 4 SO_2 + 4H_2O \quad (2)$$

where Me —Fe, Ni, Zn, Cu etc.

However, the largest extent of sulfatization (78.4%) of pyrite ($FeS_2$) was achieved at 200° C., the sulfatization extent of copper sulfides was lower.

With temperature increase to 300° C. the reaction of pyrite sulfatization proceeds as follows:

$$FeS_2 + H_2SO_4 \rightarrow FeSO_4 + S^0 + H_2S \quad (3)$$

At a temperature 300° C. sulfuric acid behaves as a strong oxidizer and a portion of iron is oxidized to Fe(III) [S. S. Naboichenko, V. I. Smimov "Hydrometallurgy of copper", Moscow, "Metallurgiay", 1974):

$$2FeS_2 + 3H_2SO_4 \rightarrow Fe_2(SO_4)_3 + S^0 + 3H_2S \quad (4)$$

There exists a method for sulfatization of zinc and copper sulfides by their dissolving in sulfuric acid of a high concentration (45–70%) at a temperature below the boiling point of these solutions (for 45% $H_2SO_4$-≦130° C.; for 70% $H_2SO_4$-≦140° C.). Under these conditions zinc sulfate was obtained ($ZnSO_4$ $H_2O$), sulfatization of copper and iron sulfates proceeded incompletely [U.S. Pat. No. 5,711,922, Jan. 27.1998; O'Brien, Robert N.].

Sulfide ores and concentrates can be also treated with a mixture of sulfuric and nitric acids at 110–170° C. Sulfuric acid concentration is 40–65%. The amount of nitric acid required for sulfatization is 0.5–3.0 moles of $HNO_3$ per 1 mole of sulfides which are contained in the treated material [U.S. Pat. No. 5,484,579, Jan. 16, 1996; O'Brien, Robert N.]. This technology does not provide a complete sulfatization of metal sulfides as well. In addition a complicated problem of utilization of gases $SO_2$ and $SO_3$, which contain nitrogen oxides arises.

All the patents mentioned above deal with a complicated and yet unsolved problem of separation of admixtures of sulfates of such metals as Al, Cu. Zn, Ni etc. from iron sulfates.

Usually the solution of metal sulfates obtained after sulfatization and leaching is oxidized with oxygen of air or by other methods in order to convert $Fe^{2+}$ to $Fe^{3+}$ then the solution is adjusted to pH=2, iron precipitates as $Fe(OH)_3$, and the admixtures remain in solution. To obtain iron (III) sulfate, iron hydroxide is again dissolved in sulfuric acid. Extraction of admixtures from the sulfuric acid solution is a complicated problem.

If the solution obtained after sulfatization contains a large amount of copper, the method of cementation with iron scrap is applied. It is described by the following reactions:

$$Fe^0Cu^{2+} \rightarrow Cu + Fe^{2+} \quad (5)$$

$$2Fe^{3+} + Fe \rightarrow 3Fe^{2+} \quad (6)$$

Copper precipitates as a metal powder, and iron converts to its bivalent form FeSO4, all admixtures, except for copper, are in solution with iron. Isolation of pure iron sulfate from this solution is a large technological problem.

The present invention is aimed at the development of the method for processing sulfide ores and concentrates, in particular pyrite, performed at lower temperatures than pyrite calcination and which results in the production of highly pure iron sulfates without using additional amounts of reagents for neutralization of strongly acidic solutions.

BRIEF DESCRIPTION OF THE DRAWING

FIG. 1 is a flow chart that schematically illustrates an exemplary hydrometallurgical process.

DISCLOSURE OF THE INVENTION

Thus, according to the present invention, there is now provided a hydrometallurgical process for producing metal-containing sulfide ores and concentrates, comprising reacting said metal-containing sulfide with concentrated sulfuric acid at a temperature of between about 300° C. and 400° C. in the presence of oxygen to produce a solid metal sulfate product and a gaseous product which is primarily $SO_3$, wherein said metal is selected from the group consisting of iron, copper, zinc, nickel, cobalt and manganese.

In preferred embodiments of the present invention said metal is iron.

In preferred embodiments of the present invention said metal sulfate product is then leached with a dilute solution of sulfuric acid, having a concentration of between 5% and 35% to extract iron values therefrom and to form an iron-containing solution.

In especially preferred embodiments of the present invention said $SO_3$ gaseous product formed from said reaction is subsequently combined with said metal-containing solution to raise the concentration of sulfuric acid in said solution to about 35% to 50% and to effect the precipitation of said metal from said solution.

Thus, in a most preferred embodiment of the present invention the milled sulfide ore, particularly pyrite $FeS_2$, is mixed with concentrated (98.3%) sulfuric acid and calcined in a furnace at a temperature about 338.8° C. and at a constant blowing of air or air enriched with oxygen.

A temperature 338.8° C. is the maximum temperature for sulfuric acid solutions, this is the boiling temperature of azeotrope containing 98.3% of $H_2SO_4$. With a temperature rise pyrite and other sulfides much better interact with sulfuric acid. In addition, an application of oxygen of air results in the following reaction for this process:

$$4FeS_2 + 6H_2SO_4 + 15O_2 \rightarrow 2Fe_2(SO_4)_3 8SO_3 + 6H_2O \quad (7)$$

The product resulted from sulfatization was leached in diluted solution of sulfuric acid ($\leq 36\%$ at $\approx 90\text{--}100°$ C.). The extraction of iron to solution was 95%, of them 92.15% was in a form of Fe (III).

After leaching the unsolved cake, containing $SiO_2$, $CaSO_4$, aluminosilicates etc, was separated from the solution by filtration. Then gas $SO_3$, formed in the sulfatization process, was blown through the solution so that to increase the concentration of sulfuric acid to 42% (Precipitation I)

$$SO_3 + H_2 \rightarrow H_2SO_4 \quad (8)$$

At such a concentration of sulfuric acid 89.1% of iron was salted out (precipitated) as highly pure $Fe_2(SO_4)_3 \cdot 4H_2SO_4$. This product was filtered off, and gas $SO_3$ was continuosly blown through the solution to a concentration of sulfuric acid 43.0–43.2% $H_2SO_4$. During this process rather unpure crystals of $Fe_2(SO_4)_3$ precipitated (Precipitation II), which were returned to stage Precipitation I for further purification. Solutions after Precipitation II were saturated with $SO_3$ to $H_2SO_4$ concentration 98.3%. At such a concentration of sulfuric acid practically all the admixtures precipitated (Precipitation III), filtered off and used for production of a concentrate of nonferrous metals. The sulfuric acid composition corresponded to that of sulfuric acid produced for sale. The acid was partially returned to the head of the process for sulfatization, partially it was used as a product ready for sale.

Iron sulfate crystals obtained after Precipitation I were decomposed at $\approx 700°$ C.

$$Fe_2(SO_4)_3 4H_2SO_4 \rightarrow Fe_2O_3 3SO_3 + 4H_2SO_4 \quad (9)$$

Gas $SO_3$ formed in this process is used at one of the precipitation stages. The admixtures after precipitation III are sulfates of such metals as Al, Ti, Zn and others. After filtration they were decomposed at 600° C.–700° C.:

$$Me_x(SO_4)_y \rightarrow xMeO + ySO_3 \quad (10)$$

The escaping gas $SO_3$ was also used for precipitation, and the residual formed after calcination is a concentrate of nonferrous metal oxides. The composition of this concentrate depends on the composition of a raw material used.

The invention will now be described in connection with certain preferred embodiments with reference to the attached flow sheet and the following examples so that it may be more fully understood.

With specific reference now to the examples, it is stressed that the particulars discussed are by way of example and for purposes of illustrative discussion of the preferred embodiments of the present invention only and are presented in the cause of providing what is believed to be the most useful and readily understood description of the principles and conceptual aspects of the invention. It is not intended, however, to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

DESCRIPTION OF PREFERRED EMBODIMENTS

EXAMPLE 1

Sulfide waste, which was obtained from sulfide ore after separation of zinc and copper concentrates by flotation, is used as a raw material. Sulfide waste has the following composition: Fe —34.0%; Al —3.34%; Ca 3.37%; Mg —3.08%; Ti —0.72%; Zn —0.21%; Pb 0.03%; Cu —0.15%; Mn —0.07%; Ni —0.003%; Co —0.015%; V —0.02%; Na —0.023%; K —0.14%; As —0.04%; Ag —3.2 $10^{-4}$%; S —22.6%; Si —4.97%; $H_2O$—9.1%, and the following fraction analysis:

| Particle size, micron | Fraction content, % |
|---|---|
| +350 | 0.90 |
| +210 | 4.82 |
| +99 | 16.07 |
| +75 | 14.63 |
| +44 | 34.13 |
| −44 | 29.45 |
| In total | 100% |

A sample of sulfide waste was milled in a ball mill to a size —75 micron —100%, then it was mixed at room temperature with concentrated sulfuric acid in a ratio 1:0.94 by weight. Mixing was made during 30 min., then the mixture obtained was loaded to a tube furnace, where the sulfatization process occurred at 338° C. Air was blown during the sulfatization process. The amount of air required was 1900 l/1kg of sulfide waste, that is 200% of the amount theoretically required according to reaction (7). Sulfatization time is 2 hours. Gas $SO_3$ escaping at sulfatization is forwarded to scrubbers for precipitations I, II or Ill. The product resulted from sulfatization was loaded to a reactor for leaching (2.4 litters of 20% $H_2SO_4$ per 1 kg of the sulfatized product). Leaching was performed at a temperature 90–100° C. for 2 hours at constant stirring, the pulp was filtered on a vacuum filter, the solution goes in a scrubber for precipitation of pure iron (III) sulfate (Precipitation I), and the cake is washed with water on a filter. Sulfuric acid was added to wash water to a concentration ≈20% and used for leaching of the following portion of the sulfatization product.

The cake after washing contained 0.1% $H_2SO_4$ free; 11.5% $CaSO_4$; 10.65% $SiO_2$; $Al_2O_3$; $TiO_2$ and other admixtures. It was neutralized by slaked lime $[Ca(OH)_2]$ that resulted in an increase in $CaSO_4$ content to 33–34%. This product can be used as a building material.

After leaching the solution contained 95.8 g/l Fe (342.8 g/l $Fe_2(SO_4)_3$), it was used for Precipitation I. The crystals obtained after Precipitation II were returned to this solution.

Precipitation I was made at room temperature by blowing $SO_3$ (gas) in order to increase the sulfuric acid concentration in solution to 42%. At such a concentration of sulfuric acid $\geq 289.1\%$ Fe precipitated in a form of chemically pure complex salt $Fe_2(SO_4)_3 \cdot 4H_2SO_4$; $\geq 99.7\%$ of admixtures remained in solution.

Iron sulfate $Fe_2(SO_4)_3 \cdot 4H_2SO_4$ was filtered on a vacuum filter, filtrate was used in the Precipitation II stage, and the salt was decomposed at a temperature 600–700° C. for 1 hour. The formed gas $SO_3$ and sulfuric acid vapor were applied to precipitate iron salts, admixtures, and to produce sulfuric acid for sale in accordance with the given technological scheme. The product obtained after calcination contained $\geq 99.7\%$ of $Fe_2O_3$, by its physical and chemical properties it was iron-oxide pigment of high quality. This product can be used both for the production of the high quality iron powder and various iron compounds ($Fe_3O_4$ etc.). The filtrate after Precipitation I contained 42% $H_2SO_4$; 21.6 g/l Fe. At stage Precipitation II it was saturated with $SO_3$ gas to a concentration of sulfuric acid in solution equal to 43.2%, the iron content in solution decreased to 7.7 g/l. A portion of admixtures, about 2% of the total amount in the raw material, was precipitated together with iron (III) sulfate crystals. The crystals were filtered and then used in Precipitation i, and the solution containing admixtures was forwarded to precipitation III., Precipitation III was also performed with $SO_3$ solution equal to 43.2%, the iron content in solution decreased to 7.7 g/l. A portion of admixtures, about 2% of the total amount in the raw material, was precipitated together with iron (III) sulfate crystals.

COMPARATIVE EXAMPLE 2

Under conditions of example 1, one weight portion of sulfide waste was mixed with 0.72 weight portions of 98.3% $H_2SO_4$, that was 80% of the theoretically required amount of sulfuric acid. After sulfatization about 70% of iron yielded to solution.

EXAMPLE 3

Under conditions of example 1, one weight portion of sulfide waste was mixed with 1.1 weight portions of 98.3% $H_2SO_4$ (120% of the theoretically required amount). The iron yield to solution was 95%.

COMPARATIVE EXAMPLE 4

Under conditions of example 1, sulfatization was performed at a temperature 250° C. The yield of iron in solution was 66%.

EXAMPLE 5

Under conditions of example 1, sulfatization was performed at a temperature 350° C. The yield of iron in solution was 95%.

EXAMPLE 6

Under conditions of example 1, the sulfatization was performed at the air amount equal to 100% of the stoichiometric amount. Elementary sulfur and $SO_2$ were formed, about 30% of iron was in its bivalent form.

COMPARATIVE EXAMPLE 7

Under conditions of example 1, leaching of the sulfatization product was made in 2% sulfuric acid solution (20 g/l $H_2SO_4$). The yield of iron to solution was 70%.

EXAMPLE 8

Under conditions of example 1 leaching was made in solution of 5% sulfuric acid. The yield of iron to solution was 94.5%.

EXAMPLE 9

Under conditions of example 1, leaching was made in 35% sulfuric acid solution. The yield of iron to solution was 94.8% because of the partial precipitation of iron sulfate.

COMPARATIVE EXAMPLE 10

Under conditions of example 1, precipitation of iron sulfate was performed by saturation of the solution with $SO_3$ gas up to $H_2SO_4$ concentration equal to 40%. Iron yield in pure crystals was 75%.

EXAMPLE 11

Under conditions of example 1 precipitation of iron sulfate was made by saturation of the solution with gas $SO_3$ up to a sulfuric acid concentration 45%. Iron yield in crystals increased to 93%, however, $Fe_2O_3$ obtained from these crystals and contained 98% of $Fe_2O_3$ and 2% of oxides of other metals.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A hydrometallurgical process for treating metal-containing sulfidic materials comprising metal-containing sulfide ores and concentrates, comprising reacting said metal-containing sulphidic materials with concentrated sulfuric acid at a temperature of between about 300° C. and 400° C. in the presence of oxygen to produce a solid metal sulfate product and a gaseous product which is primarily $SO_3$, wherein said metal is selected from the group consisting of iron, copper, zinc, nickel, cobalt and manganese.

2. A process according to claim 1, wherein said metal sulfate product is then leached with a dilute solution of sulfuric acid, having a concentration of between 5% and 35% to extract metal values therefrom and to form a metal-containing solution.

3. A process according to claim 2, wherein said $SO_3$ gaseous product formed from said reaction is subsequently combined with said metal-containing solution in stages to raise the concentration of sulfuric acid in said solution to about 35% to 50% and to effect the stage-wise precipitation of metallic sulphates from said solution.

4. A process according to claim 1, wherein the amount of sulfuric acid upon mixing with one weight portion of sulfide ore is $\geq 0.94$ weight portions of 98% sulfuric acid.

5. A process according to claim 1, wherein the hydrometallurgical process is carried out at a temperature of between 330° C. and 350° C.

6. A process according to claim 1, wherein the hydrometallurgical process is carried out in the presence of oxygen from the air, its amount being $\leq 150\%$ of the stoichiometrically required amount to convert the sulphide content of the metal-containing sulfidic material to $SO_3$.

7. A process according to claim 1, wherein leaching of the solid metal sulfate product is carried out in solution of sulfuric acid, having a concentration of about 15% to 25%.

8. A process according to claim 3, wherein separation of metallic sulfate from the solution was made by its precipitation in sulfuric acid solutions of 40%–45% $H_2SO_4$.

9. A process according to claim 8, wherein a high concentration of sulfuric acid is achieved by saturation of the solution with gas $SO_3$ at room temperature.

10. A process according to claim 9, wherein purification of sulfuric acid from at least a portion of admixtures aimed at production of the acid ready for sale was performed by saturation with gas $SO_3$ up to a concentration of sulfuric acid of 98.3%.

11. A process according to claim 1, wherein said metal is iron.

* * * * *